United States Patent
Oroskar et al.

(10) Patent No.: US 10,355,965 B1
(45) Date of Patent: Jul. 16, 2019

(54) LEVERAGING A CAPACITY INDICATOR OF A MOBILITY MANAGEMENT ENTITY

(71) Applicant: Sprint Communications Company L.P., Overland Park, KS (US)

(72) Inventors: Siddharth Oroskar, Overland Park, KS (US); Maulik K. Shah, Austin, TX (US); Jasinder Pal Singh, Olathe, KS (US); Kurtis Michael Landuyt, Parkville, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 986 days.

(21) Appl. No.: 14/330,395

(22) Filed: Jul. 14, 2014

(51) Int. Cl.
   *H04L 12/26* (2006.01)

(52) U.S. Cl.
   CPC .................... *H04L 43/16* (2013.01)

(58) Field of Classification Search
   CPC ........................................ H04L 43/16
   See application file for complete search history.

(56) References Cited

U.S. PATENT DOCUMENTS

| | | | |
|---|---|---|---|
| 8,331,224 B2 | 12/2012 | Meirosu et al. | |
| 8,504,055 B2 | 8/2013 | Vikberg et al. | |
| 8,542,590 B2 | 9/2013 | Lopez et al. | |
| 2008/0064369 A1* | 3/2008 | Xie | H04L 63/08 455/411 |
| 2010/0124933 A1* | 5/2010 | Chowdhury | H04L 12/5695 455/453 |
| 2011/0223887 A1* | 9/2011 | Rune | H04L 63/101 455/411 |
| 2011/0295996 A1* | 12/2011 | Qiu | G06F 9/505 709/224 |
| 2012/0302230 A1* | 11/2012 | Lim | H04W 76/021 455/422.1 |
| 2013/0081025 A1* | 3/2013 | Nardelli | G06F 11/3419 718/101 |
| 2013/0100813 A1 | 4/2013 | Velamati et al. | |
| 2013/0272127 A1 | 10/2013 | Ali et al. | |
| 2014/0036665 A1* | 2/2014 | Chowdhury | H04L 12/5695 370/230 |
| 2014/0297728 A1* | 10/2014 | Yanagawa | G06F 3/0611 709/203 |
| 2016/0057681 A1* | 2/2016 | Wang | H04W 8/02 370/331 |

FOREIGN PATENT DOCUMENTS

WO       2013147851       10/2013

* cited by examiner

*Primary Examiner* — Nicholas R Taylor
*Assistant Examiner* — Tania M Pena-Santana

(57) ABSTRACT

A mobility management entity to facilitate responses to service requests comprises a communication transceiver and a processing system. The communication transceiver is configured to transfer a plurality of requests for delivery to a network element. The processing system is configured to monitor response times of individual responses transmitted from the network element in response to the plurality of requests, process the response times to determine whether or not at least one of the response times exceeds a threshold value, and responsive to determining that at least one of the response times exceeds the threshold value, increase a capacity indicator that indicates an amount of loading on the mobility management entity.

10 Claims, 5 Drawing Sheets

LEVERAGING A CAPACITY INDICATOR OF A MOBILITY MANAGEMENT ENTITY

TECHNICAL BACKGROUND

A wireless communication device transmits and receives information wirelessly via a wireless access node to communicate over a communication network. Typically, the wireless access node is part of a radio access network (RAN) which provides the wireless communication device with access to further communication networks, systems, and devices. In fourth generation (4G) long term evolution (LTE) communication systems, a wireless communication device is referred to as user equipment (UE), while a wireless access node is called an enhanced node B (eNodeB).

In LTE systems, when the UE is first powered on, the initial connectivity for the UE requires it to synchronize with the network as a first step in gaining access to network resources. Typically, the UE initially communicates with the eNodeB to attempt registration with the network. In order for the UE to successfully register, the eNodeB must ensure the UE is authenticated and authorized to access the network. Accordingly, the eNodeB typically transfers an attach request for the UE to a mobility management entity (MME). In order to authenticate the UE in response to the attach request, the MME typically relies on a home subscriber server (HSS), which is commonly a database which correlates device identifiers with authorized subscriber accounts. However, there may be times when the HSS receives more authorization requests than its capacity can handle, causing delays in both processing the requests and in providing timely responses to the MME.

OVERVIEW

A method of operating a mobility management entity to facilitate responses to service requests is disclosed. The method comprises transferring a plurality of requests for delivery to a network element. The method further comprises monitoring response times of individual responses transmitted from the network element in response to the plurality of requests. The method further comprises processing the response times to determine whether or not at least one of the response times exceeds a threshold value. The method further comprises, responsive to determining that at least one of the response times exceeds the threshold value, increasing a capacity indicator that indicates an amount of loading on the mobility management entity.

A mobility management entity to facilitate responses to service requests comprises a communication transceiver and a processing system. The communication transceiver is configured to transfer a plurality of requests for delivery to a network element. The processing system is configured to monitor response times of individual responses transmitted from the network element in response to the plurality of requests, process the response times to determine whether or not at least one of the response times exceeds a threshold value, and responsive to determining that at least one of the response times exceeds the threshold value, increase a capacity indicator that indicates an amount of loading on the mobility management entity.

A computer apparatus to operate a mobility management entity to facilitate responses to service requests comprises software instructions and at least one non-transitory computer-readable storage medium storing the software instructions. The software instructions are configured, when executed by the mobility management entity, to direct the mobility management entity to transfer a plurality of requests for delivery to a network element and monitor response times of individual responses transmitted from the network element in response to the plurality of requests. The software instructions are further configured to direct the mobility management entity to process the response times to determine whether or not at least one of the response times exceeds a threshold value, and responsive to determining that at least one of the response times exceeds the threshold value, increase a capacity indicator that indicates an amount of loading on the mobility management entity.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
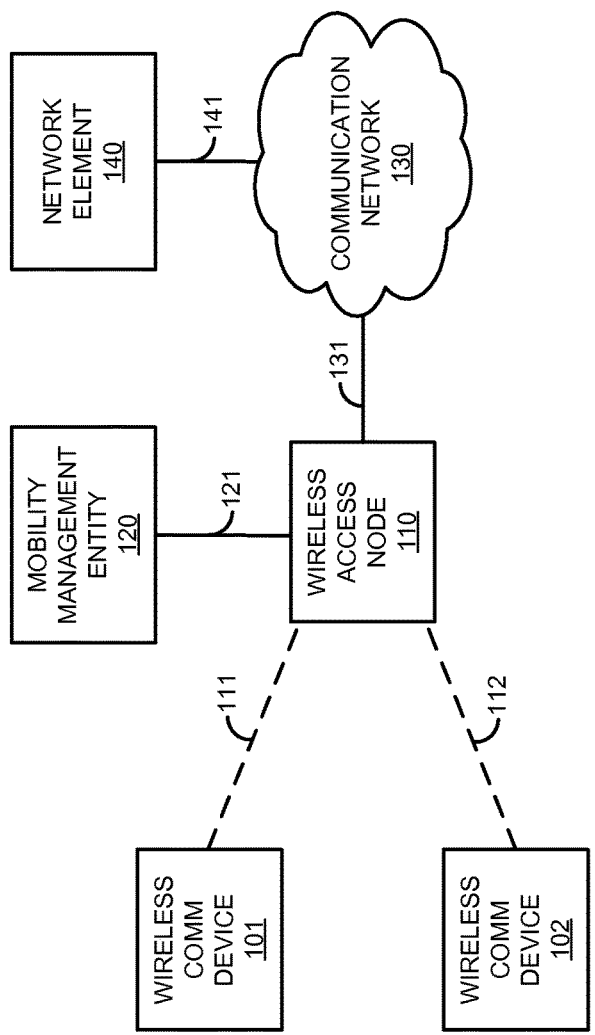
FIG. 1 is a block diagram that illustrates a communication system.

FIG. 1 is a block diagram that illustrates communication system 100. Communication system 100 includes wireless communication devices 101 and 102, wireless access node 110, mobility management entity (MME) 120, communication network 130, and network element 140. Wireless communication device 101 and wireless access node 110 are in communication over wireless communication link 111. Likewise, wireless communication device 102 and wireless access node 110 are in communication over wireless communication link 112. Mobility management entity 120 and wireless access node 110 are in communication over communication link 121. Wireless access node 110 and communication network 130 communicate over communication link 131. Network element 140 and communication network 130 are in communication over communication link 141.

Figure 2:
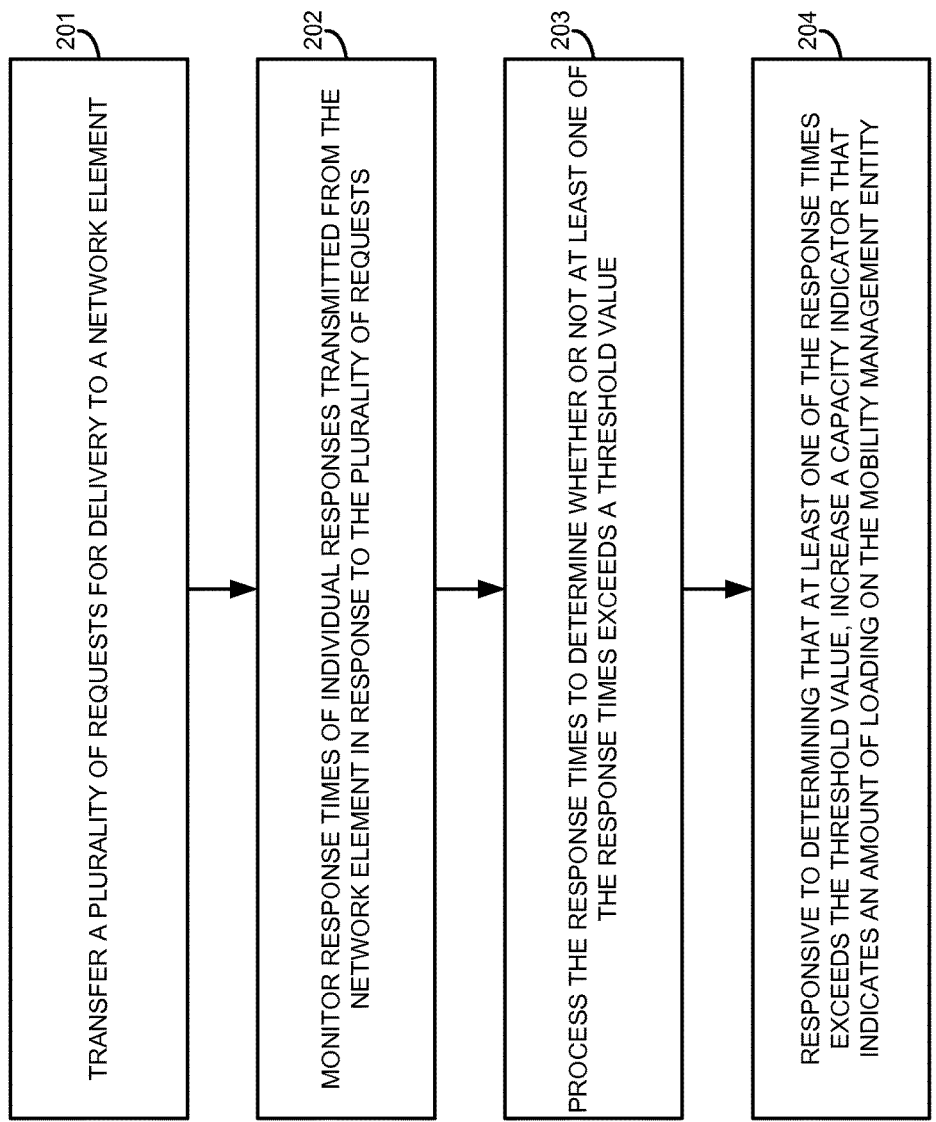
FIG. 2 is a flow diagram that illustrates an operation of the communication system.

FIG. 2 is a flow diagram that illustrates an operation of communication system 100. The steps of the operation are indicated below parenthetically. The operation of communication system 100 shown in FIG. 2 may be employed by mobility management entity 120 to facilitate responses to service requests.

As shown in the operational flow of FIG. 2, mobility management entity (MME) 120 transfers a plurality of requests for delivery to network element 140 (201). The plurality of requests sent to network element 140 could comprise queries, messages, notifications, requests, replies, or any other communications, but are typically sent by MME 120 in response to receiving attach requests from wireless access node 110. For example, when wireless communication devices 101-102 attempt to register with communication network 130, wireless access node 110 could request authentication and authorization of devices 101-102 by sending attach requests for devices 101-102 to MME 120. Continuing this example, network element 140 could comprise a home subscriber server, and MME 120 would typically communicate with the home subscriber server using the S6a interface for attach requests it receives in order to authenticate the wireless communication devices 101-102 attempting to register with the network 130. Of course, network element 140 could also comprise any other system, device, database, server, or the like.

Mobility management entity 120 monitors response times of individual responses transmitted from network element 140 in response to the plurality of requests (202). To monitor the response times, MME 120 typically tracks the duration of time it takes to receive a response back from network element 140 in response to a particular request. In some examples, MME 120 could utilize timestamps to monitor the response times of individual responses. For example, MME 120 could record a first timestamp upon sending a request for delivery to network element 140, and record a second timestamp whenever a response to the request is received back from network element 140. MME 120 could then calculate the difference between these two timestamps to determine the total time elapsed from making the request and receiving a response. Of course, the above procedure of calculating a response time is merely exemplary, and other techniques are possible for monitoring response times of individual responses transmitted from network element 140 and are within the scope of this disclosure.

MME 120 processes the response times to determine whether or not at least one of the response times exceeds a threshold value (203). Typically, MME 120 compares the response times calculated in operational step 202 to the threshold value to determine if at least one of the response times exceeds the threshold. In some examples, the threshold value could be predetermined, but the threshold could also be calculated dynamically in other examples, such as based on the longest and/or shortest observed response time, a mathematical average or median of all the individual response times, or any other factors. MME 120 could use some or all of the recorded response times when determining whether or not at least one exceeds the threshold. For example, MME 120 could process the response times to determine whether or not at least one of the response times exceeds the threshold value by calculating an average response time of the response times and determining whether or not the average response time exceeds the threshold value. Many other techniques of processing the response times to determine whether or not at least one of the response times exceeds a threshold value are possible and within the scope of this disclosure.

Responsive to determining that at least one of the response times exceeds the threshold value, MME 120 increases a capacity indicator that indicates an amount of loading on the mobility management entity (204). For example, MME 120 may typically have a relative capacity indicator used to indicate an amount of communication loading on MME 120, where a larger value for the capacity indicator indicates a higher loading level. However, in this case, MME 120 increases the capacity indicator when at least one of the response times of the individual responses received from network element 140 exceeds the threshold value, even if MME 120 itself is not experiencing increased demand on its capacity. In some examples, MME 120 could increase the capacity indicator responsive to determining that at least one of the response times exceeds the threshold value by determining that a threshold quantity of the response times individually exceed the threshold value. For example, the threshold value could be set to ten seconds and the threshold quantity could be five, so that MME 120 would only increase the capacity indicator if at least five of the individual response times are greater than ten seconds. In some examples, MME 120 could monitor a quantity of the plurality of requests transferred for delivery to network element 140 during a time period. In this scenario, MME 120 could increase the capacity indicator based in part on the quantity of the plurality of requests transferred for delivery to network element 140 during the time period. Of course, it should be understood that although the above disclosure refers to behavior in response to exceeding threshold values, various implementation decisions and/or threshold value selections may dictate the behavior in the case of at least one of the response times equaling the threshold value. For example, MME 120 may still increase the capacity indicator if at least one of the response times equals or exceeds the threshold value in some examples. Other design choices to implement the above techniques are also possible and within the scope of this disclosure.

Once MME 120 increases the capacity indicator, wireless access node 110 could be configured to request service from a different mobility management entity based on the capacity indicator that indicates the amount of loading on MME 120. For example, wireless access node 110 could be configured to select a different mobility management entity whenever the capacity indicator of MME 120 meets or exceeds a threshold capacity level. Further, in some examples, in response to a request transmitted from wireless access node 110 and responsive to determining that at least one of the response times exceeds the threshold value, MME 120 could be configured to transfer a message for delivery to wireless access node 110 that suggests a different mobility management entity. Wireless access node 110 could then send any further requests to the different mobility management entity, which may have access to different network elements other than the overloaded MME 120.

Advantageously, MME 120 tracks how long it takes network element 140 to respond to service requests and compares these response times to a threshold value. If one or more of the response times exceeds the threshold time limit, MME 120 increases its capacity indicator, which is typically used to indicate heavy communication loading at the MME. However, the techniques described above effectively leverage the capacity indicator to also indicate when a network element 140 on which the MME 120 relies is exhibiting significant delays in responding to requests made by the MME 120. In this manner, wireless access node 110 is made aware of the increased delay due to lengthy response times from network element 140, and may thus select a different MME for routing future attach requests to alleviate the load on network element 140 and improve the user experience of users attempting to connect to communication network 130.

Referring back to FIG. 1, wireless communication devices 101 and 102 may individually comprise any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication devices 101 and 102 may also include a user interface, memory system, software, processing circuitry, or some other communication components. For example, wireless communication devices 101 and 102 could each comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication devices 101 and 102 include Code Division Multiple Access (CDMA) 1×RTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between wireless communication devices 101-102 and wireless access node 110.

Wireless access node 110 comprises RF communication circuitry and an antenna. The RF communication circuitry typically includes an amplifier, filter, RF modulator, and signal processing circuitry. Wireless access node 110 may also comprise a router, server, memory device, software, processing circuitry, cabling, power supply, network communication interface, structural support, or some other communication apparatus. Wireless access node 110 could comprise a base station, Internet access node, telephony service node, wireless data access point, or some other wireless communication system—including combinations thereof. Some examples of wireless access node 110 include a base transceiver station (BTS), base station controller (BSC), radio base station (RBS), Node B, enhanced Node B (eNodeB), and others—including combinations thereof. Wireless network protocols that may be utilized by wireless access node 110 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof.

Mobility management entity 120 comprises a processing system and communication transceiver. Mobility management entity 120 may also include other components such as a router, server, data storage system, and power supply. Mobility management entity 120 may reside in a single device or may be distributed across multiple devices. Mobility management entity 120 may be a discrete system or may be integrated within other systems—including other systems within communication system 100. In some examples, mobility management entity 120 could comprise a computing system, control plane function, paging system, control node, device management system, database system, session initiation protocol (SIP) server, authentication, authorization, and accounting (AAA) server, home agent, packet data serving node (PDSN), network switch, mobile switching center, router, switching system, packet gateway, network gateway system, Internet access node, application server, service node, firewall, or some other communication system—including combinations thereof.

Communication network 130 comprises the core network of a wireless communication service provider, and could include routers, gateways, telecommunication switches, servers, processing systems, or other communication equipment and systems for providing communication and data services. Communication network 130 could comprise wireless communication nodes, telephony switches, Internet routers, network gateways, computer systems, communication links, or some other type of communication equipment—including combinations thereof. Communication network 130 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 130 may be configured to communicate over metallic, wireless, or optical links—including combinations thereof. Communication network 130 may be configured to use time-division multiplexing (TDM), Internet Protocol (IP), Ethernet, optical networking, wireless protocols, communication signaling, or some other communication format—including combinations thereof. In some examples, communication network 130 includes further access nodes and associated equipment for providing communication services to many wireless communication devices across a large geographic region.

Network element 140 comprises a processing system and communication transceiver. Network element 140 may also include other components such as a router, server, data storage system, and power supply. Network element 140 may reside in a single device or may be distributed across multiple devices. Network element 140 may be a discrete system or may be integrated within other systems—including other systems within communication system 100. In some examples, network element 140 could comprise a database system, home subscriber server (HSS), session initiation protocol (SIP) server, authentication, authorization, and accounting (AAA) server, home agent, packet data serving node (PDSN), network switch, mobile switching center, router, switching system, packet gateway, network gateway system, Internet access node, application server, service node, firewall, or some other communication system—including combinations thereof.

Wireless communication links 111 and 112 use the air or space as the transport medium. Wireless communication links 111 and 112 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. Wireless communication links 111 and 112 may comprise many different signals sharing the same link. For example, wireless communication links 111 and 112 could include multiple signals operating in a single propagation path comprising multiple communication sessions, frequencies, timeslots, transportation ports, logical transportation links, network sockets, IP sockets, packets, or communication directions—including combinations thereof.

Communication links 121, 131, and 141 use metal, air, space, optical fiber such as glass or plastic, or some other material as the transport medium—including combinations thereof. Communication links 121, 131, and 141 could use various communication protocols, such as TDM, IP, Ethernet, telephony, optical networking, hybrid fiber coax (HFC), communication signaling, wireless protocols, or some other communication format—including combinations thereof. Communication links 121, 131, and 141 may be direct links or could include intermediate networks, systems, or devices.

Figure 3:
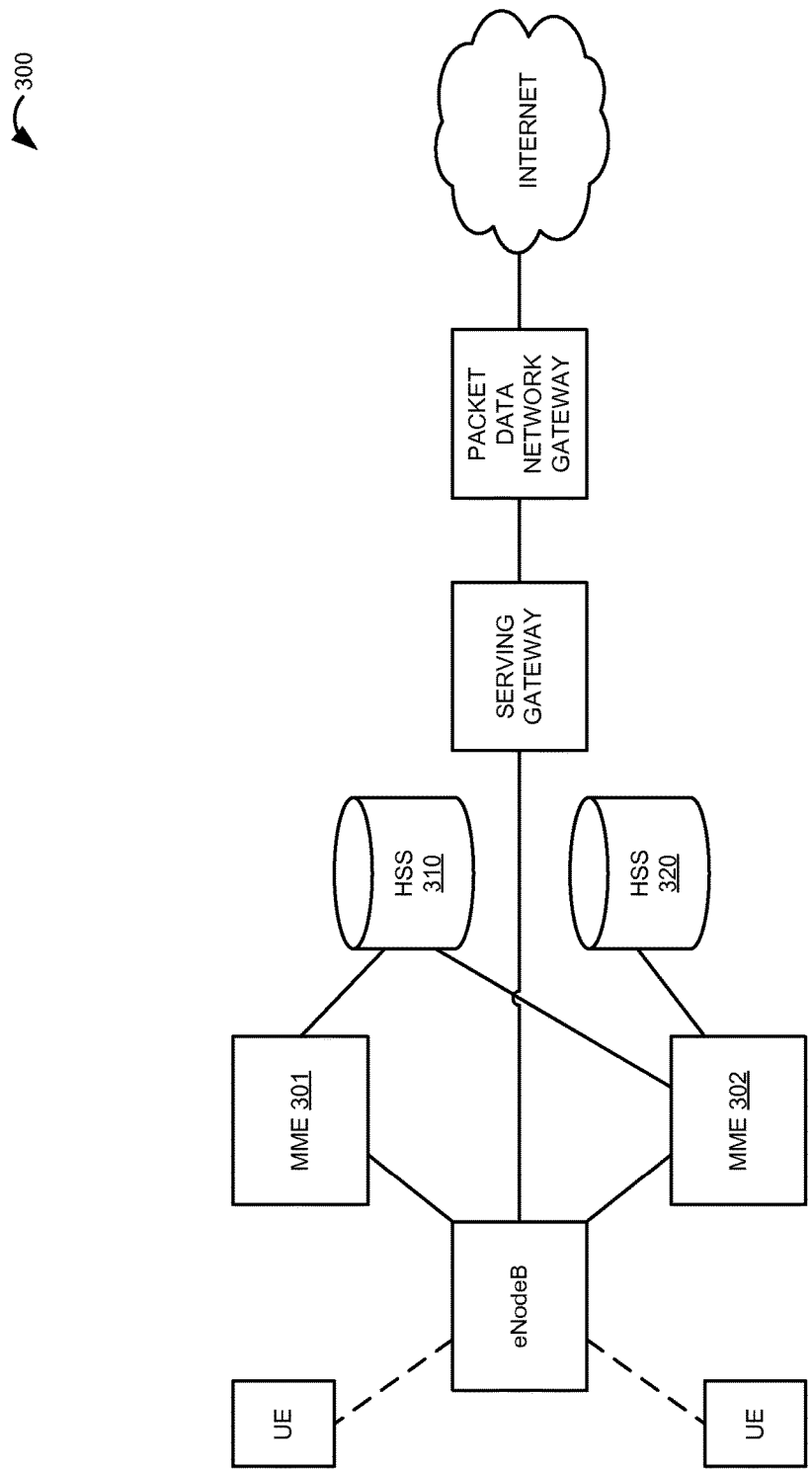
FIG. 3 is a block diagram that illustrates a communication system in an exemplary embodiment.

FIG. 3 is a block diagram that illustrates long term evolution (LTE) communication system 300 in an exemplary embodiment. LTE communication system 300 includes an enhanced Node B (eNodeB) base station that is serving two user equipment (UE) devices. The eNodeB base station is also in communication with mobility management entity (MME) 301, MME 302, and a serving gateway (S-GW). The S-GW is linked to a packet data network gateway (P-GW) that leads to the internet. MME 301 and MME 302 are both in communication with home subscriber server (HSS) 310. MME 302 is also in communication with HSS 320. Although not shown, LTE communication system 300 could also include other network elements typically found in an LTE network.

In operation, an MME 301/302 typically functions as the key control node for the LTE access network. The MME plays a role in selecting an S-GW for a UE during an initial attach procedure and is involved in activating and deactivating the bearer channel. The MME supports the S1 interface with the eNodeB and the S11 interface with the S-GW. Among other functionality, the MME is responsible for authenticating users by interacting with the HSS over the S6a interface for attach requests received from the eNodeB. The MME typically utilizes a relative capacity indicator to indicate a loading level that the MME is presently experiencing, which may be used to load balance between different MMEs within an MME pool. However, in situations where an HSS is overloaded or otherwise slow to respond to authentication requests, the MME will in turn be delayed in responding to attach requests from the eNodeB, even when the capacity indicator of the MME is relatively low and the MME is not otherwise overloaded. A detailed description of how an MME might inform the eNodeB of an overloaded HSS and suggest a different MME that may have access to a different HSS will now be discussed with respect to FIG. 4.

Figure 4:
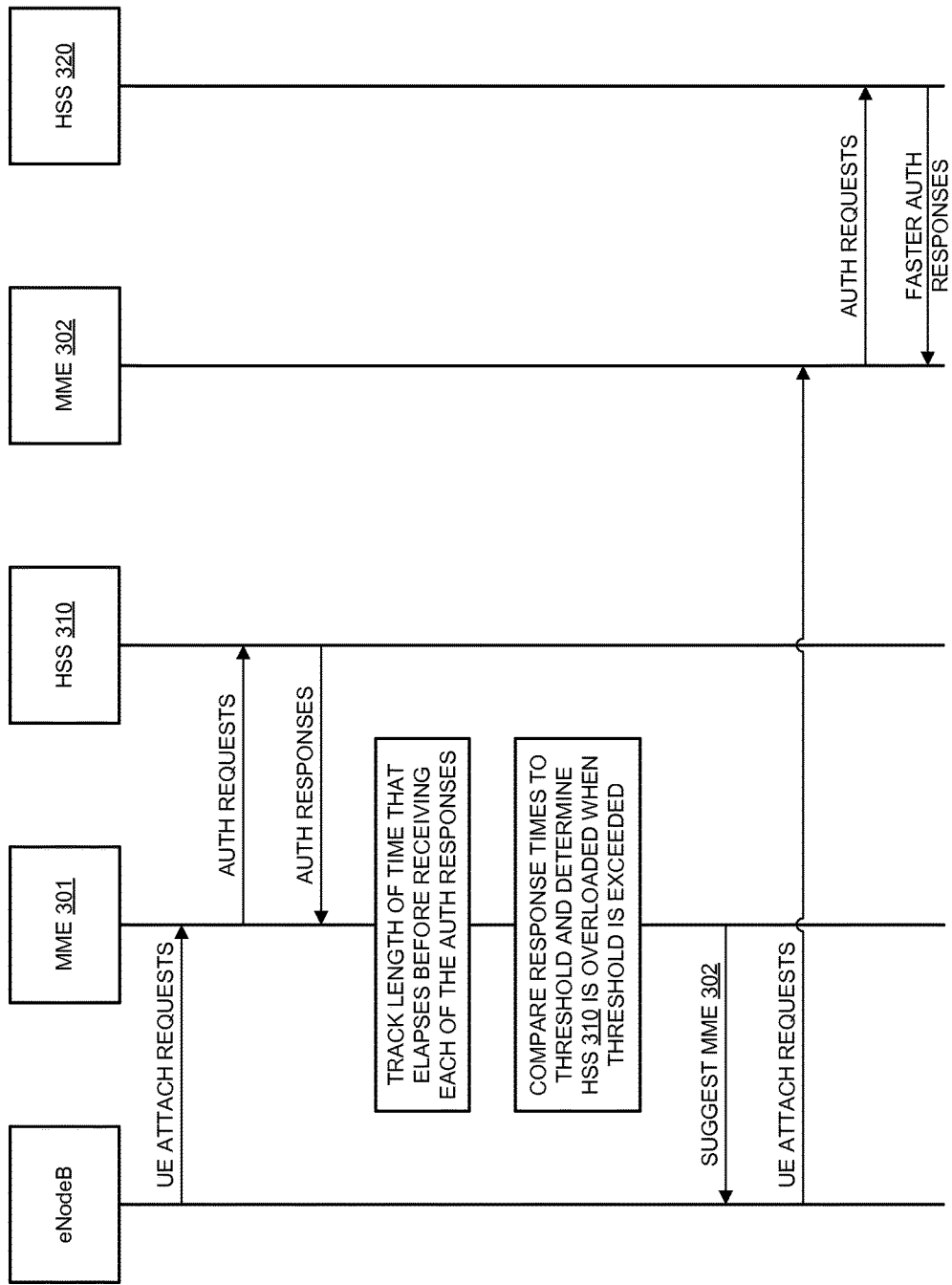
FIG. 4 is a sequence diagram that illustrates an operation of a communication system in an exemplary embodiment.

FIG. 4 is a sequence diagram that illustrates an operation of LTE communication system 300 in an exemplary embodiment. Initially, the UE devices attempt to register with the network by communicating with the eNodeB. The eNodeB transfers attach requests for the UEs to MME 301. In response to the attach requests, MME 301 communicates with HSS 310 to authenticate the UEs. In response to the attach requests, the HSS 310 transfers authorization responses to MME 301 that indicate whether or not the UEs are authorized to access the network.

MME 301 tracks the length of time that elapses before receiving each of the authentication responses. MME 301 could track these response times in a number of ways, such as running a timer from when an authentication request is sent to HSS 310 to when the associated authentication response is received, recording timestamps of when an authentication request is sent and upon receiving the response, or any other technique that may be used to track the length of time that elapses before receiving a response from HSS 310. As the individual response times are calculated, MME 301 compares the response times to a threshold value. If at least one of the response times exceeds the threshold, MME 301 may determine that HSS 310 is overloaded. In some cases, MME 301 could require that a threshold quantity of response times all exceed the threshold duration before determining that HHS 310 is overloaded.

Once MME 301 has determined that HSS 310 is overloaded, MME 301 could respond in a variety of ways. In some examples, MME 301 could increase its relative capacity indicator, which would inform the eNodeB that MME 301 is reaching its capacity and prompt the eNodeB to select another MME 320 from the MME pool for processing further attach requests. MME 301 would increase its capacity indicator in this manner even when the MME is not itself in an overloaded condition but is still slow in responding to attach requests from the eNodeB due to the slow responsiveness of HSS 310. Further, in some examples, MME 301 could use different and/or new indicators to inform the eNodeB of response issues from other network elements like HSS 310, such as HSS backhaul health/responsiveness, S-GW backhaul health, or any other status metrics for network elements that MME 301 may interact with or from which MME 301 may wait for responses.

Additionally or alternatively, MME 301 could suggest a different MME that may have access to a different HSS other than HSS 310, such as MME 302 which has access to HSS 320. For example, MME 301 could have information about which HSS 310 and/or 320 that each MME 301 and 302 can utilize and may track the loading status on both HSS 310 and 320. In some examples, MME 301 may be provided with and/or maintain a table that relates identifiers for MMEs 301 and 302 to their associated home subscriber servers. MME 301 could then redirect the eNodeB to another MME 302 that has access to a different HSS pool.

Referring again to the sequence diagram of FIG. 4, in this example MME 301 determines that MME 302 has access to a different HSS pool, namely HSS 320, and thus MME 301 transfers a message for delivery to the eNodeB to suggest that the eNodeB send further attach requests to MME 302 instead of MME 301. In response to receiving the message suggesting MME 302, the eNodeB sends subsequent attach requests for delivery to MME 302. In turn, MME 302 transfers an authorization request for the UE to HSS 320. HSS 320 processes the authorization request and responds to the request with an indicator of whether or not the UE is authorized to access the network. In this example, because there is less demand on HSS 320 as compared with HSS 310, MME 302 is able to respond to attach requests from the eNodeB faster than MME 301 which must wait for a response from the overloaded HSS 310.

Figure 5:
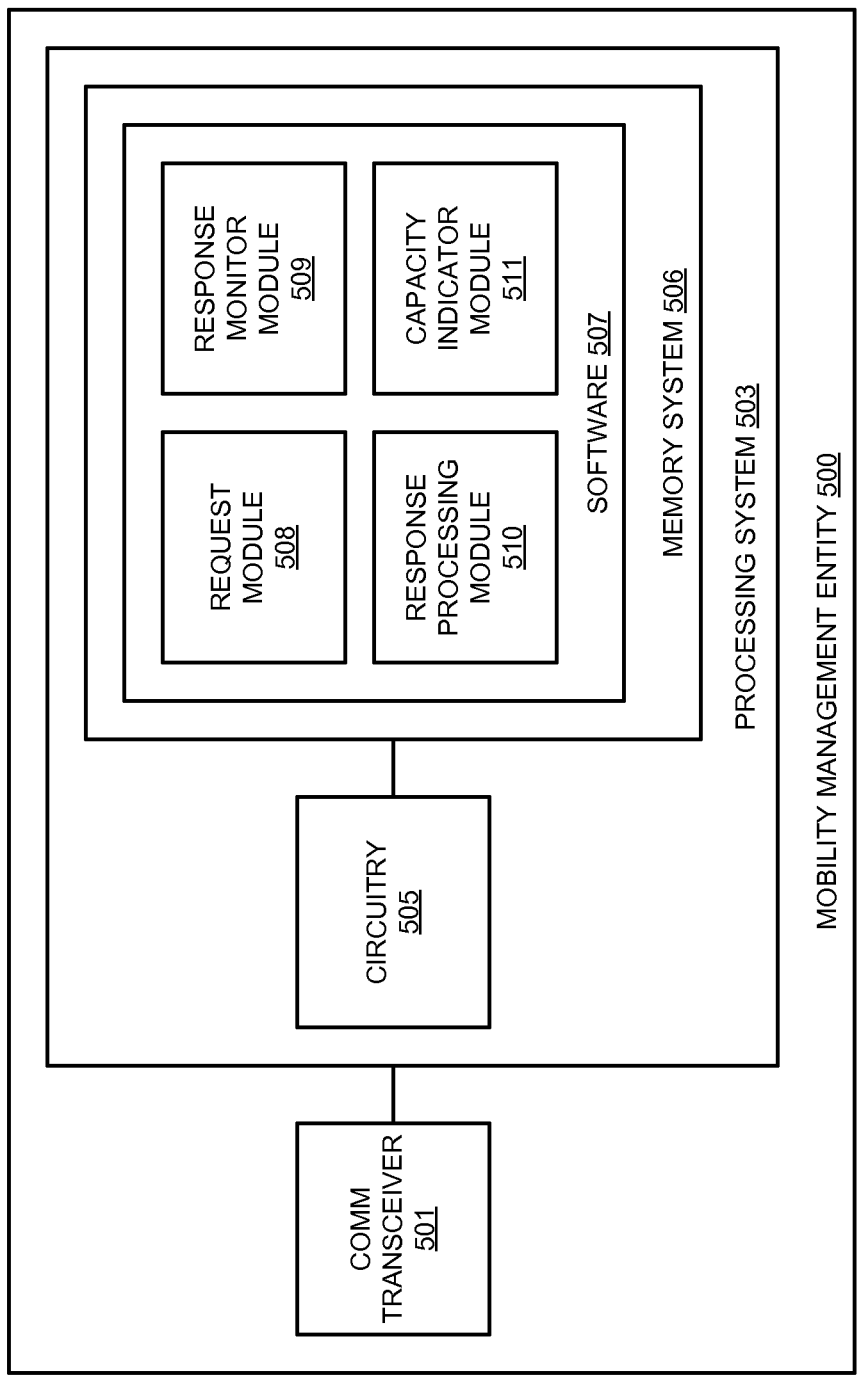
FIG. 5 is a block diagram that illustrates a mobility management entity.

FIG. 5 is a block diagram that illustrates mobility management entity 500. Mobility management entity 500 provides an example of MME 120, although MME 120 may use alternative configurations. Mobility management entity 500 comprises communication transceiver 501 and processing system 503. Processing system 503 is linked to communication transceiver 501. Processing system 503 includes processing circuitry 505 and memory device 506 that stores operating software 507. Operating software 507 comprises software modules 508-511.

Communication transceiver 501 comprises components that communicate over communication links, such as network cards, ports, RF transceivers, processing circuitry and software, or some other communication components. Communication transceiver 501 may be configured to communicate over metallic, wireless, or optical links. Communication transceiver 501 may be configured to use TDM, IP, Ethernet, optical networking, wireless protocols, communication signaling, or some other communication format—including combinations thereof. Communication transceiver 501 could be configured to transfer a plurality of requests for delivery to a network element in some examples.

Processing circuitry 505 comprises microprocessor and other circuitry that retrieves and executes operating software 507 from memory system 506. Processing circuitry 505 may comprise a single device or could be distributed across multiple devices—including devices in different geographic areas. Processing circuitry 505 may be embedded in various types of equipment. Memory system 506 comprises a non-transitory computer readable storage medium, such as a disk drive, flash drive, data storage circuitry, or some other hardware memory apparatus. Memory system 506 may comprise a single device or could be distributed across multiple devices—including devices in different geographic areas. Memory system 506 may be embedded in various types of equipment. In some examples, a computer apparatus could comprise memory system 506 and operating software 507. Operating software 507 comprises computer programs, firmware, or some other form of machine-readable processing instructions. Operating software 507 may include an operating system, utilities, drivers, network interfaces, applications, or some other type of software. In this example, operating software 507 comprises software modules 508-511, although software 507 could have alternative configurations in other examples.

When executed by circuitry 505, operating software 507 directs processing system 503 to operate as described herein for mobility management entity 120. In particular, operating software 507 may direct processing system 503 to direct communication transceiver 501 to transfer a plurality of requests for delivery to a network element. Operating software 507 further directs processing system 503 to monitor response times of individual responses transmitted from the network element in response to the plurality of requests. Operating software 507 also directs processing system 503 to process the response times to determine whether or not at least one of the response times exceeds a threshold value. Finally, operating software 507 directs processing system 503 to, responsive to determining that at least one of the response times exceeds the threshold value, increase a capacity indicator that indicates an amount of loading on mobility management entity 500.

In some examples, operating software 507 could comprise request software module 508 that transfers a plurality of requests for delivery to a network element. Additionally, operating software 507 could comprise a response monitor software module 509 that monitors response times of individual responses transmitted from the network element in response to the plurality of requests. Further, operating software 507 could comprise a response processing software module 510 that processes the response times to determine whether or not at least one of the response times exceeds a threshold value. Finally, operating software 507 could comprise a capacity indicator software module 511 that increases a capacity indicator that indicates an amount of loading on the mobility management entity responsive to determining that at least one of the response times exceeds the threshold value.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication network to wirelessly attach User Equipment (UE) to the wireless communication network, the method comprising:
   a wireless access point wirelessly receiving UE attachment requests from UEs and wirelessly transferring the UE attachment requests to a first mobility manager;
   the first mobility manager processing the UE requests and wirelessly transferring an authorization requests to a first authorization database;
   the first authorization database processing the authorization requests and wirelessly transferring authorization responses to the first mobility manager;
   the first mobility manager recording first timestamps indicating when each of the authentication requests are sent to the authorization database and second timestamps indicating when each of the authentication responses are received from the authorization database, and determining that at least one difference in a first timestamp and its corresponding second timestamp exceeds a time threshold indicating an authorization database overload;
   in response to the authorization database overload, the first mobility manager selecting a second mobility manager to attach to a second authorization database and wirelessly transferring signaling to the wireless access point indicating the second mobility manager; and
   the wireless access point wirelessly receiving the signaling indicating the second mobility manager, wirelessly receiving additional UE attachment requests from the UEs, and wirelessly transferring the UE attachment requests to the second mobility manager.

2. The method of claim 1 wherein the first mobility manager comprises a first Mobility Management Entity (MME) and the second mobility manager comprises a second MME.

3. The method of claim 1 wherein the first authorization database comprises a first Home Subscriber Server (HSS) and the second authorization database comprises a second HSS.

4. The method of claim 1 wherein wireless access point comprises a NodeB.

5. The method of claim 1 further comprising the first mobility manager maintaining a table that relates an identifier for the first mobility manager to an identifier to the first authorization database and an identifier of the second mobility manager and to an identifier to the second authorization database.

6. A wireless communication network to wirelessly attach User Equipment (UE) to the wireless communication network, the wireless communication network comprising:
   a wireless access point configured to wirelessly receive UE attachment requests from UEs and wirelessly transfer the UE attachment requests to a first mobility manager;
   the first mobility manager configured to process the UE requests and wirelessly transfer an authorization requests to a first authorization database;
   the first authorization database configured to process the authorization requests and wirelessly transfer authorization responses to the first mobility manager;
   the first mobility manager configured to record first timestamps indicating when each of the authentication requests are sent to the authorization database and second timestamps indicating when each of the authentication responses are received from the authorization database, and determine that at least one difference in a first timestamp and its corresponding second timestamp exceeds a time threshold indicating an authorization database overload;
   in response to the authorization database overload, the first mobility manager configured to select a second mobility manager to attach to a second authorization database and wirelessly transfer signaling to the wireless access point indicating the second mobility manager; and the wireless access point configured to wirelessly receive the signaling indicating the second mobility manager, wirelessly receive additional UE attachment requests from the UEs, and wirelessly transfer the UE attachment requests to the second mobility manager.

7. The wireless communication network of claim 6 wherein the first mobility manager comprises a first Mobility Management Entity (MME) and the second mobility manager comprises a second MME.

8. The wireless communication network of claim 6 wherein the first authorization database comprises a first Home Subscriber Server (HSS) and the second authorization database comprises a second HSS.

9. The wireless communication network of claim 6 wherein wireless access point comprises a NodeB.

10. The wireless communication network of claim 6 further comprising the first mobility manager configured to maintain a table that relates an identifier for the first mobility manager to an identifier to the first authorization database and an identifier of the second mobility manager and to an identifier to the second authorization database.

* * * * *